US009177120B2

(12) United States Patent
Peled et al.

(10) Patent No.: US 9,177,120 B2
(45) Date of Patent: *Nov. 3, 2015

(54) METHOD AND APPLICATION FOR A REACTIVE DEFENSE AGAINST ILLEGAL DISTRIBUTION OF MULTIMEDIA CONTENT IN FILE SHARING NETWORKS

(75) Inventors: Ariel Peled, Even-Yehuda (IL); Ofir Carny, Kochav-Yair (IL); Arik Baratz, Hadera (IL); Oded Arbel, Kiryat Ono (IL); Lidror Troyansky, Givataim (IL)

(73) Assignee: PortAuthority Technologies, Inc., San Diego, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/557,420

(22) Filed: Jul. 25, 2012

(65) Prior Publication Data

US 2012/0291135 A1 Nov. 15, 2012

Related U.S. Application Data

(62) Division of application No. 12/615,332, filed on Nov. 10, 2009, now Pat. No. 8,271,555, which is a division of application No. 09/897,013, filed on Jul. 3, 2001, now Pat. No. 7,627,897.

(60) Provisional application No. 60/259,228, filed on Jan. 3, 2001.

(51) Int. Cl.
*G06F 21/10* (2013.01)
*G06F 17/30* (2006.01)

(52) U.S. Cl.
CPC .......... *G06F 21/10* (2013.01); *G06F 17/30017* (2013.01); *G06F 2221/0737* (2013.01)

(58) Field of Classification Search
CPC ..... G06F 21/10–21/16; G06F 21/552–21/554; G06F 17/30017; G06F 2221/0737; G11B 20/00086; G11B 20/00855–20/00869; G11B 20/00971
USPC .......................................................... 726/32
See application file for complete search history.

(56) References Cited

U.S. PATENT DOCUMENTS

| | | | |
|---|---|---|---|
| 7,006,508 B2 | 2/2006 | Bondy et al. | |
| 7,043,473 B1 * | 5/2006 | Rassool et al. | 1/1 |
| 7,272,613 B2 * | 9/2007 | Sim et al. | 709/223 |
| 2001/0051996 A1 * | 12/2001 | Cooper et al. | 709/217 |
| 2001/0052081 A1 | 12/2001 | McKibben et al. | |
| 2002/0062315 A1 * | 5/2002 | Weiss et al. | 707/100 |
| 2002/0069098 A1 * | 6/2002 | Schmidt | 705/7 |

(Continued)

OTHER PUBLICATIONS

Winn Schwartau, CNN—Cyber-vigilantes hunt down hackers—Jan. 12, 1999.*

(Continued)

*Primary Examiner* — Linglan Edwards
*Assistant Examiner* — Kevin Bechtel

(57) ABSTRACT

A system for external monitoring of networked digital file sharing to track predetermined data content, the system comprising: at least one surveillance element for deployment over said network, said surveillance elements comprising: surveillance functionality for searching said digital file sharing and identification functionality associated with said search functionality for identification of said predetermined data content, therewith to determine whether a given file sharing system is distributing said predetermined data content.

3 Claims, 10 Drawing Sheets

(56) References Cited

U.S. PATENT DOCUMENTS

| | | |
|---|---|---|
| 2002/0082901 A1* | 6/2002 | Dunning et al. ............... 705/10 |
| 2002/0087885 A1 | 7/2002 | Peled et al. |
| 2010/0057906 A1 | 3/2010 | Peled et al. |
| 2011/0075842 A1 | 3/2011 | Le Barz et al. |

OTHER PUBLICATIONS

RFC 2782—A DNS RR for specifying the location of services (DNS SRV); Feb. 2000.*
Official Action Dated Feb. 7, 2007 From the US Patent and Trademark Office Re.: U.S. Appl. No. 09/897,013.
Official Action Dated Oct. 10, 2007 From the US Patent and Trademark Office Re.: U.S. Appl. No. 09/897,013.
Official Action Dated May 15, 2008 From the US Patent and Trademark Office Re.: U.S. Appl. No. 09/897,013.
Notice of Allowance Dated May 15, 2012 From the US Patent and Trademark Office Re.: U.S. Appl. No. 12/615,332.
Notice of Allowance Dated Jul. 23, 2009 From the US Patent and Trademark Office Re.: U.S. Appl. No. 09/897,013.
Official Action Dated Aug. 3, 2011 From the US Patent and Trademark Office Re.: U.S. Appl. No. 12/615,332.
Official Action Dated May 3, 2011 From the US Patent and Trademark Office Re.: U.S. Appl. No. 12/615,332.
Official Action Dated Feb. 7, 2005 From the US Patent and Trademark Office Re.: U.S. Appl. No. 09/897,013.
Official Action Dated Sep. 8, 2005 From the US Patent and Trademark Office Re.: U.S. Appl. No. 09/897,013.
Official Action Dated Dec. 13, 2011 From the US Patent and Trademark Office Re.: U.S. Appl. No. 12/615,332.
Official Action Dated May 19, 2005 From the US Patent and Trademark Office Re.: U.S. Appl. No. 09/897,013.
Official Action Dated Sep. 30, 2008 From the US Patent and Trademark Office Re.: U.S. Appl. No. 09/897,013.
Official Action Dated Dec. 31, 2008 From the US Patent and Trademark Office Re.: U.S. Appl. No. 09/897,013.
Response Dated Sep. 12, 2011 to Official Action to Aug. 3, 2011 From the US Patent and Trademark Office Re.: U.S. Appl. No. 12/615,332.
Response Dated May 18, 2011 to Official Action of May 3, 2011 From the US Patent and Trademark Office Re.: U.S. Appl. No. 12/615,332.
BigChampagne "BigChampagne and MusicIP Partner to Bring Standardized Online Music Search and Measurement Capabilities. Partnership to Lead to Enhanced Product and to Aide Artists and Music Lovers", BigChampagne Press Release, 2 P., 2006.
Brown "Who Is Spying on Your Downloads?", http://archive.salon.com/tech/feature/2001/03/27/media_tracker/index.html, 2001.
Eick "Surveillance Strategies for a Class of Adaptive-Routing Algorithms in Circuit-Switched DNHR Communications Networks: A Simulation Study", IEEE Journal on Selected Areas in Communications, 6(4): 760-765, May 1988.
Howe "BigChampagne Is Watching You. In Fact, They're Tracking Every Download and Selling the Data to the Music Industry. How One Company Is Turning File-Sharing Networks Into the World's Biggest Focus Group", Wired 11.10, 4 P., 2004. http://www.wired.com/wired/archive/11.10/fileshare_pr.html.
Huntwork et al. "Pervasive Surveillance Using a Cooperative Mobile Sensor Network", Proceedings of the 2006 IEEE International Conference on Robotics and Automation, Orlando, Florida, USA, ICRA 2006, p. 2099-2104, May 15-19, 2006.
Wang et al. "An Effective Communication Model for Collaborative Commerce of Web-Based Surveillance Services" Proceedings of the IEEE International Conference on E-Commerce, CEC'03, p. 40-44, Jun. 24-27, 2003.
Applicant-Initiated Interview Summary Dated Feb. 6, 2014 From the US Patent and Trademark Office Re. U.S. Appl. No. 13/557,420.

* cited by examiner

METHOD AND APPLICATION FOR A REACTIVE DEFENSE AGAINST ILLEGAL DISTRIBUTION OF MULTIMEDIA CONTENT IN FILE SHARING NETWORKS

RELATED APPLICATIONS

This application is a divisional of U.S. patent application Ser. No. 12/615,332 filed on Nov. 10, 2009, which is a divisional of U.S. patent application Ser. No. 09/897,013 filed on Jul. 3, 2001, now U.S. Pat. No. 7,627,897, which claims the benefit of priority under 35 USC §119(e) of U.S. Provisional Patent Application No. 60/259,228 filed on Jan. 3, 2001. The contents of the above applications are all incorporated by reference as if fully set forth herein in their entirety.

FIELD OF THE INVENTION

The present invention relates generally to the field of digital copyright protection. More specifically, the present invention deals with identification of and active/reactive protection measures against copyright infringement of digital media in digital file sharing networks and publicly accessible distribution systems.

FIELD AND BACKGROUND OF THE INVENTION

File sharing systems and other publicly accessible distribution systems over the Internet are often used for distribution of copyright protected content, such distribution often comprises infringement of copyright protection laws. Such illegal or unauthorized distribution cause financial damages to the lawful content owners. It is therefore of great interest to find a method that may stop or at least reduce such acts without, at the same time, interfering with the lawful use of such systems.

Methods for copyright enforcement over digitally distributed media in file distribution and sharing systems are known. Some of the known methods are only affective for providing protection against centralized file sharing systems, where locating desired content is aided by a central server or servers providing the service. (e.g., the "Napster" file sharing service). In such a case, software on such central servers may monitor information exchange, and thereby prohibit illegal or unauthorized use. Such methods require the cooperation of the service operator or administrator. However, protection of copyrighted content delivered through decentralized distribution systems (sometimes known as "peer to peer" networks— e.g., "Gnutella", "FreeNet", "Usenet" etc'), as well as protection of copyrighted content in centralized file sharing services without the cooperation of the service operator or administrator, is much harder, and these problems are not addressed by current legal or technological methods. It is foreseeable that as the availability of disk space and bandwidth for data communication increases, illegal or unauthorized distribution of video and audio content may become prevalent unless effective counter-measures are available.

SUMMARY OF THE INVENTION

According to a first aspect of the present invention there is provided a system for external monitoring of networked digital file sharing to track predetermined data content, the system comprising:

at least one surveillance element for distribution over the network, the surveillance elements comprising:

search functionality for nodewise searching of the networked digital file sharing and identification functionality associated with the search functionality for identification of the predetermined data content, therewith to determine whether a given file sharing system is distributing the predetermined data content.

Preferably, the search functionality is operable to carry out searching at a low level of a network protocol.

Alternatively or additionally, the search functionality is operable to carry out searching at a high level of a network protocol.

Alternatively or additionally, the search functionality is operable to carry out the searching at an application level.

Preferably, the surveillance element is a first surveillance element in which the search functionality comprises functionality for operating search features of the networked digital file sharing.

Preferably, the identification functionality comprises use of a signature of the predetermined content.

Preferably, the signature comprises a title of the predetermined content.

Preferably, the signature comprises a derivative of a title of the predetermined content.

Preferably, the signature comprises a statistical processing result carried out on the content.

Preferably, the signature comprises a signal processing result carried out on the content.

Preferably, the signature comprises a description of the content.

Preferably, the signature is a derivative of the description of the content.

Preferably, the surveillance element is a second surveillance element and comprises interception functionality for intercepting data transport on the network, and wherein the identification functionality is associated with the interception functionality for finding an indication of the data content within the intercepted data transport.

Preferably, the identification functionality comprises a signature of the predetermined content for comparison with data of the intercepted message to determine whether the message contains the evidence of the data content.

Preferably, the content comprises alphanumeric data and the signature is a derivation of the alphanumeric data.

Preferably, the content comprises binary data and the signature comprises a derivation of the binary data.

Preferably, the derivation is a hash function of the binary data.

Preferably, the derivation is a function of metadata of the content.

Preferably, the signature comprises a title of the data content.

Preferably, the signature comprises a derivative of the title of the data content.

Preferably, the signature comprises a statistical processing result carried out on the content.

Preferably, the signature comprises a signal processing result carried out on the content.

Preferably, the signature comprises a description of the content.

Preferably, the signature comprises a derivative of the description of the content.

Preferably, the surveillance element further comprises input/output functionality for receiving commands from the system and sending results of the search.

Preferably, the system further comprises a co-ordination element for interacting with the distributed input/output functionality to control deployment of the surveillance elements over the network and to monitor results from a plurality of the surveillance elements.

Preferably, the co-ordination element is further operable to interact with reaction elements by providing the reaction elements with details of locations of the predetermined content obtained from the surveillance elements, thereby to prompt the reaction elements to react against the locations.

Preferably, the file sharing comprises a document exchange system and the surveillance element further comprises functionality for representing itself as a host server for the system, thereby to obtain data of documents on the system for the search functionality.

In a particularly preferred embodiment there is additionally provided:

at least two first surveillance elements, each first surveillance element comprising functionality for operating search features of the networked digital file sharing.

at least two second surveillance elements, each the second surveillance element comprising interception functionality for intercepting messaging on the network, and wherein the identification functionality is associated with the interception functionality for identifying evidences of the data content within the intercepted messages, and at least one control element for deploying the surveillance elements around the network and obtaining search results from the surveillance elements.

Preferably, the surveillance element is a first surveillance element and the search functionality comprises functionality for operating search features of the networked digital file sharing.

Preferably, the identification input functionality is operable to receive input from a comparator associated with a signature holder for holding a signature of the predetermined content, the comparator being operable to compare the content against the signature thereby to indicate to the input functionality the presence of the content.

Preferably, the signature comprises a title of the predetermined content.

Preferably, the signature is a derivative of a title of the predetermined content.

Preferably, the signature comprises a statistical processing result carried out on the content.

Preferably, the signature comprises a signal processing result carried out on the content.

Preferably, the signature comprises a description of the content.

Preferably, the signature comprises a derivative of a description of the content.

Preferably, the surveillance element is a second surveillance element and comprises interception functionality for intercepting messaging on the network, and wherein the identification functionality is associated with the interception functionality for identifying evidences of the data content within the intercepted messages.

Preferably, the search functionality further comprises input/output functionality for receiving commands from the system and sending results of the search.

Preferably, the system further comprises a co-ordination element for interacting with the distributed input/output functionality to control deployment of the surveillance elements over the network and to monitor results from a plurality of the surveillance elements, the co-ordination element further being operable to interact with the attack elements by providing the attack elements with details of locations of the predetermined content obtained from the surveillance elements, thereby to prompt the attack elements to attack the locations.

Preferably, the file sharing comprises a document exchange system and the surveillance element further comprises functionality for representing itself as a host server for the system, thereby to obtain data of the file sharing for the search functionality.

Preferably, the identification functionality is operable to identify items in the document exchange system comprising the predetermined content.

Preferably, the attack element comprises functionality to send to the system a delete command to delete the item throughout the system.

Preferably, the attack element comprises repetitive output functionality for repeatedly sending response requests to the file sharing system.

Preferably, the response request comprises a download request.

The system is preferably operable to co-ordinate response requests between a plurality of attack elements distributed over the network.

The system is preferably operable to co-ordinate download requests between a plurality of the attack elements distributed over the network.

Preferably, the surveillance agent is a third surveillance element, comprising network protocol scan functionality operable to intercept and analyze network communication items of a predetermined network traffic, thereby to find protected content in transport.

The system preferably comprises at least one attack element, wherein the attack functionality is operable to utilize features of the file sharing in the attack.

A preferred embodiment comprises at least one attack element wherein the attack functionality comprises transport interference functionality for interfering with messaging over the network.

Preferably, the transport interference functionality comprises exchange functionality for exchanging the predetermined message content in the messaging with other message content.

Preferred embodiment additionally or alternatively comprise:

at least two first surveillance elements, each first search element comprising functionality for operating search features of the networked digital file sharing, at least two second surveillance elements, each the second surveillance element comprising interception functionality for intercepting messaging on the network, and wherein the identification functionality is associated with the interception functionality for identifying evidences of the data content within the intercepted messages, at least two of the attack elements, and at least one control element for distributing the surveillance and attack elements around the network, obtaining surveillance results from the surveillance elements, and coordinating activity of the attack elements to carry out a coordinated multiple point attack on the file sharing system.

According to a second aspect of the present invention there is provided a system for external monitoring and control of networked digital file sharing to track predetermined data content and limit distribution thereof, the system comprising:

at least one surveillance element for distribution over the network, the surveillance element comprising:
  surveillance functionality for searching the digital file sharing and
  identification input functionality associated with the search functionality for receiving an indication of the presence of the predetermined content, and
at least one attack element, comprising:

input functionality for receiving identification data of a file sharing system found to be distributing the predetermined content, and attack functionality for applying an attack to the file sharing system to reduce the file sharing system's ability to distribute the predetermined data content.

According to a third aspect of the present invention there is provided a network external content distribution control system comprising:

network content identification functionality for identifying predetermined content distributed over a digital file sharing network, the network comprising a plurality of nodes, and network attack functionality for applying an attack over the digital file sharing network, the attack being directable to reduce the ability of the network to distribute the identified content.

Preferably, at least one of the nodes is identified to have the predetermined content, and at least one of the nodes being identified as a distribution node of the network, the attack being directable at the distribution node.

According to a fourth aspect of the present invention there is provided a network external content distribution control system comprising at least one surveillance unit for exploring a network to determine at least one of a presence and a distribution pattern of predetermined content and for reporting the determination for remote analysis.

According to a fifth aspect of the present invention there is provided a network scanning element for use in a network external content distribution control system, the scanning element being operable to scan at least a portion of a network suspected of distributing predetermined content by connecting to available ports in the network portion, via the port connections to determine the presence of network nodes participating in the distribution.

According to a sixth aspect of the present invention there is provided a method of externally scanning a distributed network comprising a plurality of nodes, to search for predetermined content available for distribution from the nodes, the method comprising:

distributing at least one surveillance element to the network, the surveillance element comprising:

search functionality for nodewise searching of the networked digital file sharing and identification functionality associated with the search functionality for identification of the predetermined data content, therewith to determine whether a given file sharing system is distributing the predetermined data content.

BRIEF DESCRIPTION OF THE DRAWINGS

The present invention will be understood and appreciated more fully from the following detailed description taken in conjunction with the appended drawings in which.

DESCRIPTION OF SPECIFIC EMBODIMENTS OF THE INVENTION

Embodiments of the present invention comprise a method and system for information gathering about the distribution of illegal or unauthorized content in file sharing and distribution systems, and possibly for active reduction of the availability of file sharing and distribution systems for the unauthorized distribution of copyrighted content on publicly accessible networks. The system preferably comprises one or more types of surveillance elements, which accumulate different kinds of information regarding the illegal or unauthorized distribution of copyrighted content over file sharing and distribution systems, as well as other information that may be relevant for attempts to stop or reduce such distribution. The system may also use one or more types of offensive elements, which may attempt to stop or reduce the illegal or unauthorized distribution once the possible or actual existence of such an act is detected. The above elements may be physically separated, thereby increasing the robustness of the system against counter-counter measures. The identification of the illegal or unauthorized content is executed inside a surveillance element, and may be based on alphanumeric data, such as the possible variants of its title and/or a derivative of its title and/or description, and/or on "signatures" of binary files (e.g., a "hash function" of the binary file or parts thereof) and/or on the properties of the content as video and/or as audio signal and/or as a textual content (e.g., methods that are based on the identification of a signature indicating the content), or on meta data included with the content (such as ID3 tags). Once illegal or unauthorized distribution of content via a certain file sharing system and/or newsgroup is detected, by one or more of the surveillance elements, the system may use offensive elements in order to attempt to interfere with the illegal or unauthorized activities. The offensive elements may use specific features and known vulnerabilities of the file sharing and distribution systems and/or vulnerabilities in the infrastructures such systems depend upon. In particular, the present disclosure describes several methods that can be used against illegal file distribution in decentralized, peer-to-peer file sharing system, such as "Gnutella", and against the document distribution network commonly referred to as "Internet newsgroups".

The present embodiments provide a method and system that can be used in order to monitor and/or reduce or eliminate the use of file-sharing networks and/or newsgroups for illegal content distribution in computer networks such as the Internet. The embodiments may be used to supplement a secure content distribution system, e.g. a video or audio-on demand system operating over the Internet or other network.

Figure 1:
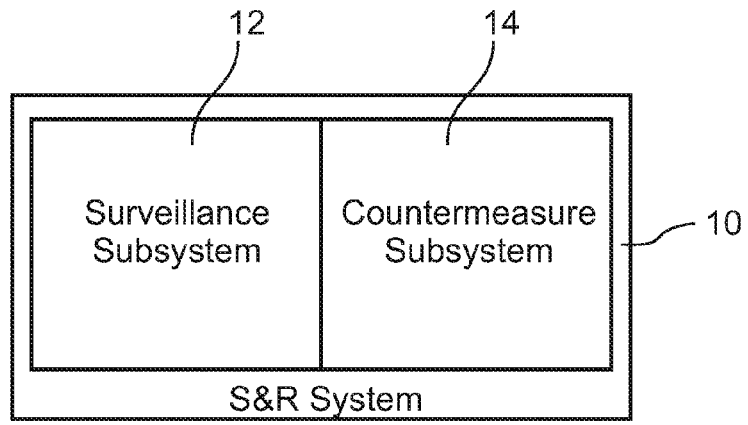
FIG. 1 is a simplified block diagram of a first preferred embodiment of the present invention showing a surveillance subsystem and a countermeasures subsystem.

Reference is now made to FIG. 1, which is a simplified block diagram showing a system according to a first preferred embodiment of the present invention. A network content distribution surveillance and reaction system 10 comprises two subsystems 12 and 14, the first of which 12 is a surveillance subsystem for carrying out surveillance of the file-sharing network and document distribution system. The surveillance subsystem preferably makes use of surveillance elements, as referred to above, to gather data about the various content items that are available. The second subsystem 14 is a countermeasure subsystem comprising the offensive or attack elements referred to above, which are able to take various active steps in order to reduce or eliminate illegal content distribution.

Figure 2:
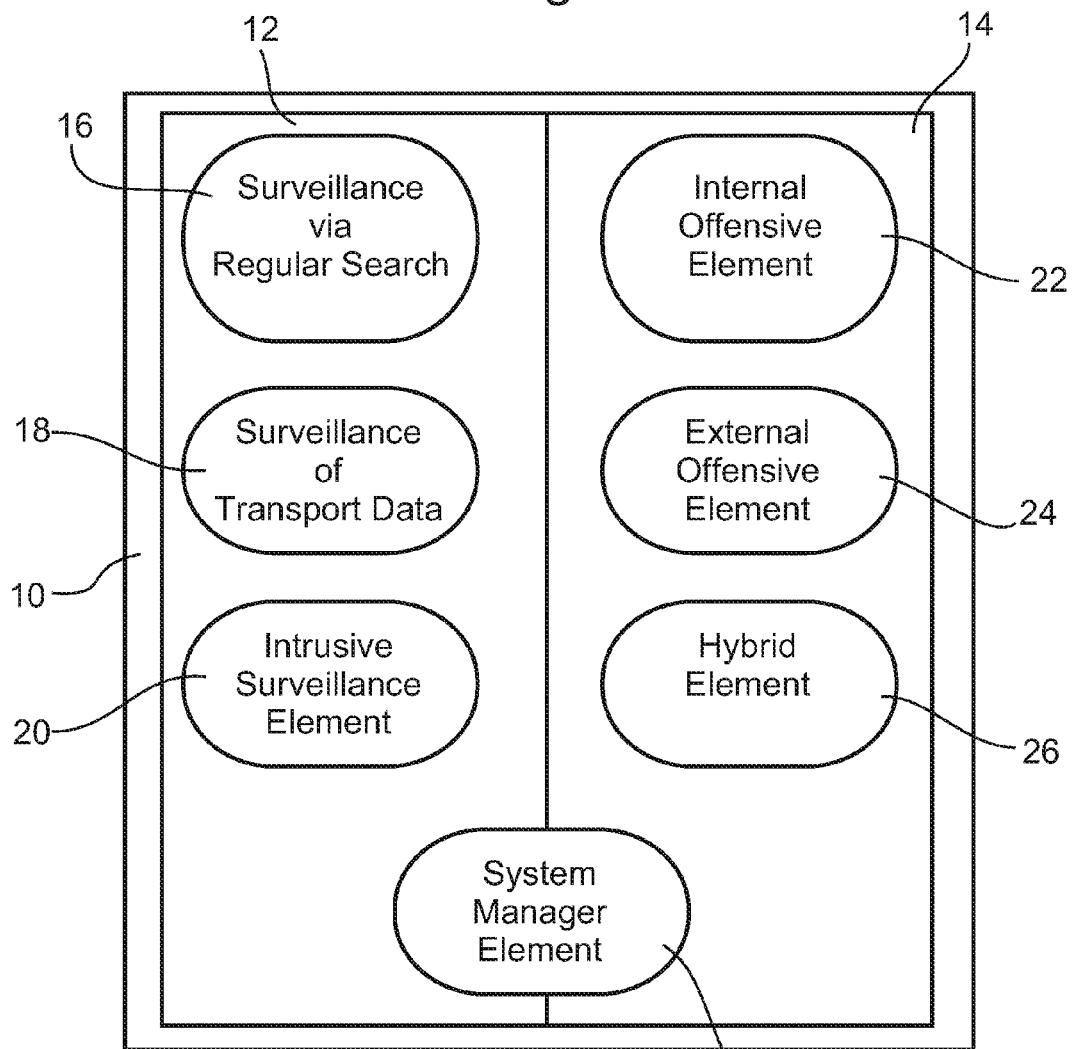
FIG. 2 is a simplified block diagram of the embodiment of FIG. 1 in greater detail, showing elements of the subsystems of FIG. 1.

Reference is now made to FIG. 2, which is a simplified block diagram showing the two subsystems of FIG. 1 in greater detail. In FIG. 2, the system is shown to comprise a series of elements for use together. One such element, referred to hereinbelow as a first surveillance element 16, is preferably a network application that appears as a regular agent or client of the file-sharing network. The surveillance elements preferably perform a search for to-be-protected content, specifically using tools that the file-sharing system supplies for such a search. The surveillance elements may use a polymorphic search, possibly in several languages and/or several cinematic cuts and/or several audio mixing sessions in order to cover the various forms in which the content names or descriptors may appear. The search for specific content may be obscured using a wider search for innocent content. The search for specific content is referred to hereinbelow as an initiated search. Such an approach takes advantage of one essential property of the file sharing and/or distribution system, that in order to be convenient for users, content has to be easy to find. If the initiated search forces the distribution systems to use less straightforward content names it will have made the illegal material less available to users and will have to some extent achieved its purpose.

If the file-sharing and/or distribution system does not allow searches, and in an attempt to increase the amount of content that it is possible to detect, an attempt to guess content names is preferably made, using methods such as the so-called dictionary attack, based on the name of the protected content and/or an attempt to crawl the file-sharing content space using various methods provided by the file sharing network, and/or crawling or searching other locations or networks which may refer to content in the aforementioned file-sharing system. The method will be described in greater detail below.

Additional elements 18, referred to as second surveillance elements preferably perform a search that is based on an analysis of data being transported, for example query data or data being downloaded, between other elements in the network. Such a transport analysis type of search is referred to hereinbelow as a transport search. The second surveillance elements preferably use high-performance computers, with wide bandwidth and disc space and an optimized connection scheme, in order to process large amounts of traffic and thereby find a large proportion of traffic of illegal content and data relating thereto. The surveillance elements preferably use a polymorphic indexed search based on the content name and\or descriptor (possibly in several languages) and\or a search for a signature of the content, i.e., idiosyncratic properties of the audio and\or video signal, that either exist in the original signal or are added to the original signal as watermarks. Methods for obtaining signatures relating to an earlier search and performing searches are described, e.g., in U.S. Pat. Nos. 6,125,229, 5,870,754 and 5,819,286. Methods for watermark embedding and usage are described, e.g., in U.S. Pat. Nos. 5,960,081, 5,809,139 and 6,131,161. The contents of each of the above documents are hereby incorporated by reference.

A further type of surveillance element is the intrusive surveillance element 20. Intrusive surveillance elements preferably scan communication protocols such as Internet Protocol in order to find illegal content in transport. If such content is found, the elements can report about the illegal transport to the appropriate authorities, and may interfere with the content transport method and interrupt or cancel the transfer.

The surveillance elements and/or the intrusive surveillance elements may be present or rely on scanning not only of lower levels of the network protocols (such as network data-link and transport) but also of higher levels (up to and including application levels, especially when considering the case of a virtual network whose lower levels are based on the higher level of the basic underlying network. The latter is generally the case in many file sharing networks.

Also there are provided two kinds of offensive elements, internal offensive or attack elements 22 and external offensive elements 24. Again, the offensive elements are preferably embodied as autonomous agents, able to locate themselves at will over the network. The internal agents 22 are based on file sharing system protocols (often involving client programs) and appear to be nodes of the network. The internal offensive agents 22 preferably use the features of the file sharing system in order to perform various attacks on distributors of illegal content, as will be described in more detail below.

The external offensive elements 24 need not use the file sharing system protocols. External offensive elements 24 may preferably use various types of attacks that may not be possible while using the standard file-sharing network programs.

There are preferably also provided hybrid elements 26 which incorporate various combinations of properties of the above elements.

A further element for incorporation in the system is a system manager or coordinator element 28. As mentioned above, the elements referred to may be distributed over a network. A unit is thus preferably provided to accumulate the network intelligence data from the surveillance entities, analyze the data, and coordinate required attacks. The coordinator may likewise be provided as an autonomous agent, providing the advantage that the system as a whole is able to center itself anywhere on the network, making it harder for countermeasures to be effective.

Figure 3:
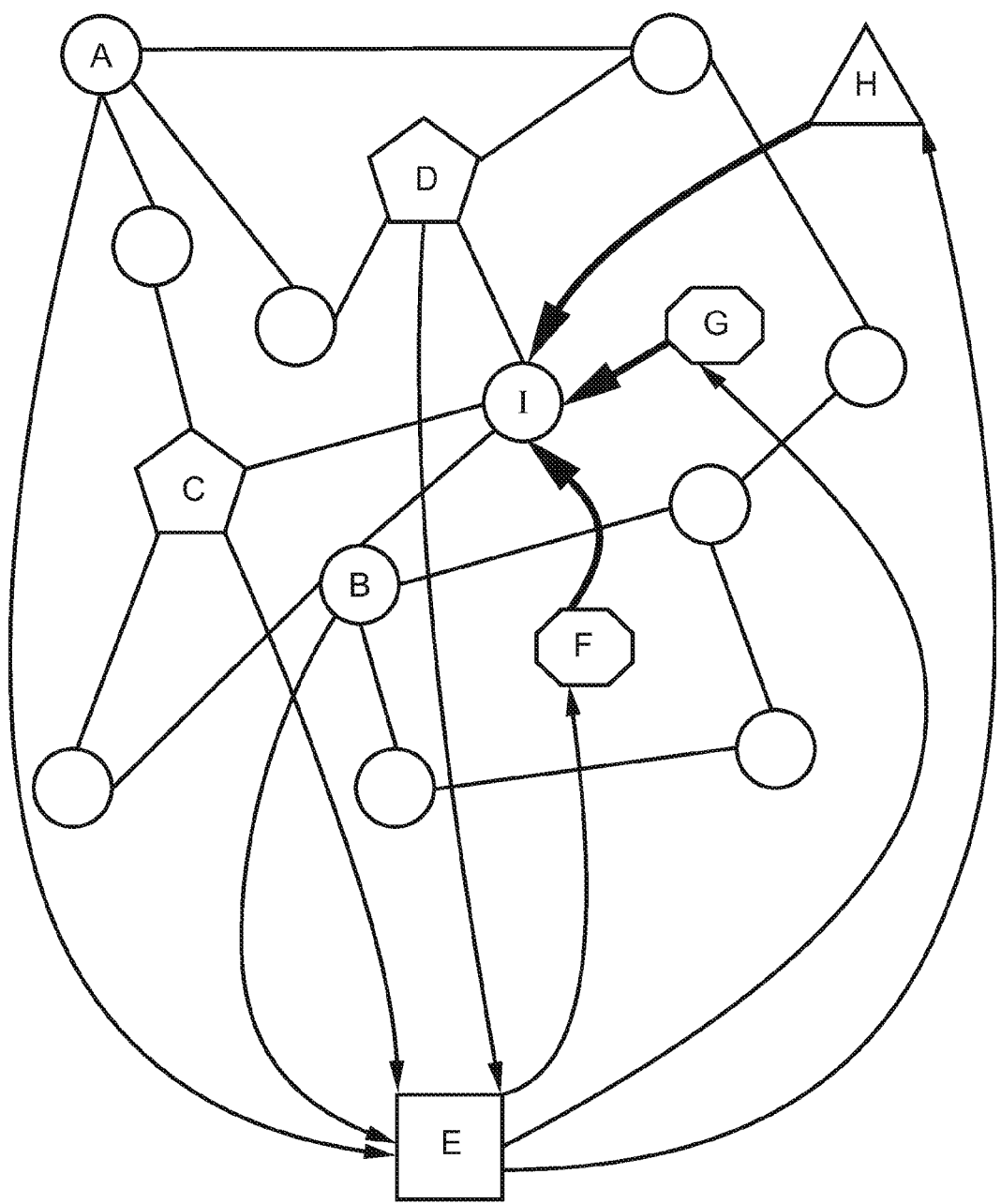
FIG. 3 is an illustration of the topology of decentralized peer-to-peer file sharing system such as "Gnutella", together with the position of the system elements.

Reference is now made to FIG. 3, which is a simplified block diagram showing a decentralized peer-to-peer file sharing system such as "Gnutella", and illustrating preferred positions of the system entities. The first two surveillance elements, (A), and (B) perform distributed initiated searches for the content to be protected, while the next two surveillance elements (C) and (D) perform transport searches. In one embodiment of the system, results of the above searches are then returned to the coordinator (E) via a secure channel (dashed arrows pointed to (E)). Elements (F) and (G) are system offensive agents and element (H) is an external offensive element that can perform attacks against (I) (black arrows). The attacks can be coordinated by the coordinator (E) (dashed arrows starting from (E)). In another embodiment of the system, the system elements communicate using a "peer-to-peer" type of communication.

Figure 4:
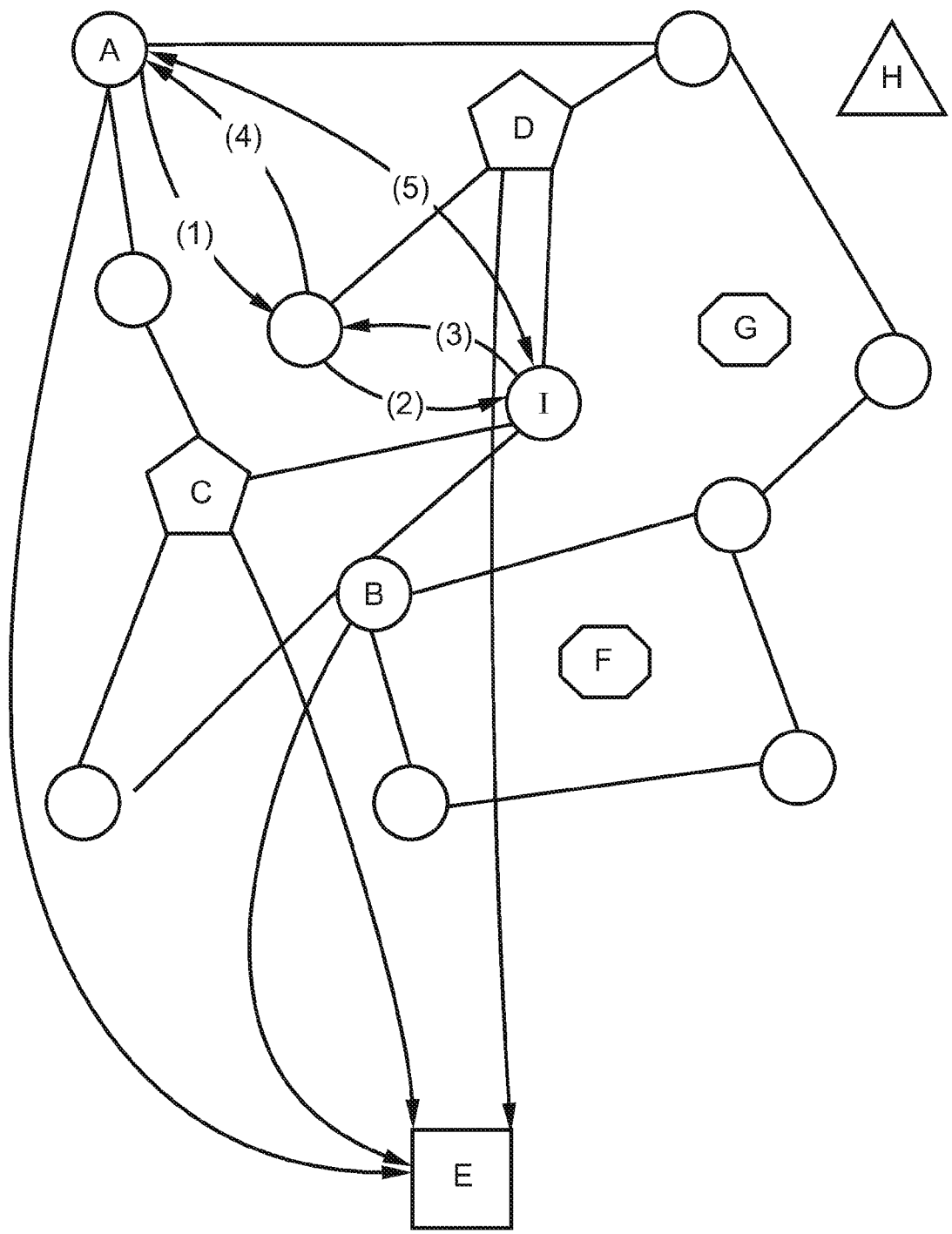
FIG. 4 is an illustration of an initiated search by "surveillance element"

Reference is now made to FIG. 4, which is a block diagram of the decentralized peer to peer file sharing system of FIG. 3, illustrating element interaction in an initiated search by the first surveillance element (A). A search query propagates via the system elements to reach a possible distributor of illegal content (I), who replies that he has the content. The search answers prorogate back to (A). (A) then connects to (I) and preferably starts to download the content. (A) may further check that the downloaded content is indeed the required content by comparing a signature of the required content with the signature of the downloaded content.

The information gathered by the surveillance elements (e.g., the details of the replays to its queries) can be used in order to create reports and (possibly) also to inform the interested parties (e.g., via e-mail or web-based interface)

Methods for performing denial of service (DoS) attacks are known, and are regularly performed, (often illegally), against Internet servers. In the context of the present embodiments, DoS attacks are preferably performed against servers of file sharing systems that are involved in illegal digital content piracy, providing that the required legal authorization exists.

Figure 5:
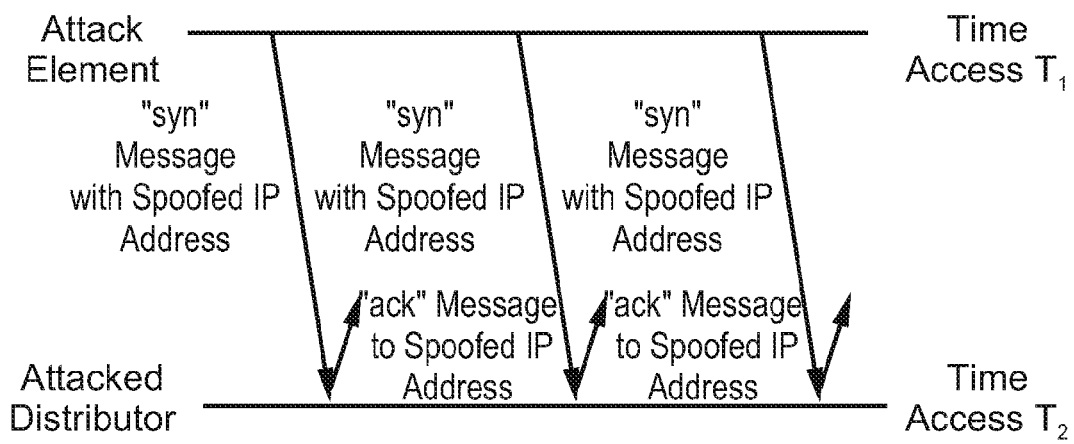
FIG. 5 is an illustration of a simple denial of service (DoS) attack, based on sending multiple "syn" messages against a distributor of illegal or unauthorized content.

Reference is now made to FIG. 5, which is a simplified timing diagram describing a simple attack that the offensive elements may perform against an illegal content distributor. The attack is a standard "denial of service" (DoS) attack, and is based on multiple "syn" messages with preferably spoofed (forged) IP addresses. As known to the skilled person, a spoofed IP address may be a legal (routable) IP address of a non-existent or otherwise irrelevant network entity. In some file sharing networks, e.g., "Gnutella", the attacker need not be part of the network. The attack is preferably continued or even increased until (I)'s resources are exhausted.

Figure 6:
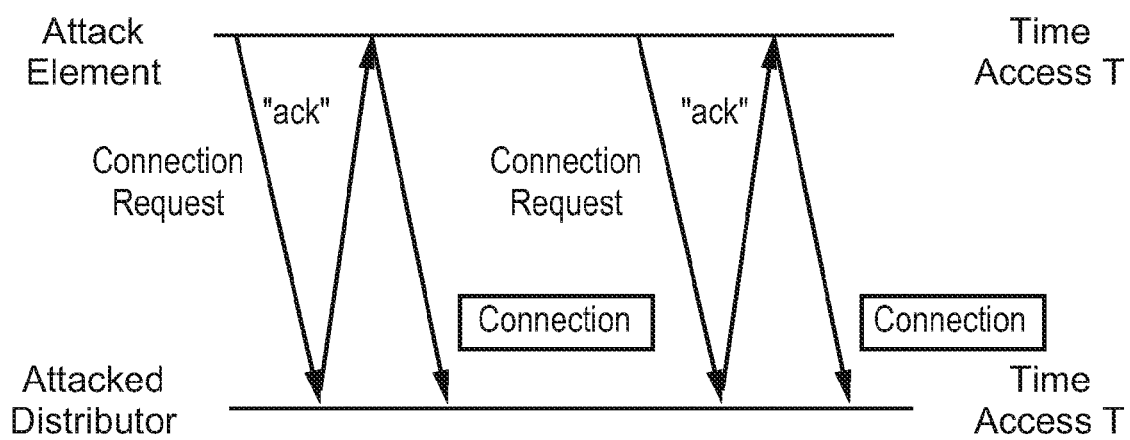
FIG. 6 is an illustration of another simple denial of service (DoS) attack, based on multiple requests, in short time intervals, to make connections.

Reference is now made to FIG. 6, which is a further timing diagram illustrating another simple DoS attack. The attack is based on multiple requests, in short time intervals, to make connections (e.g., TCP connections) with the distributor (I). The attack again preferably continues until the resources of (I) (e.g., connectivity, CPU, RAM, storage etc.) are exhausted.

Figure 7:
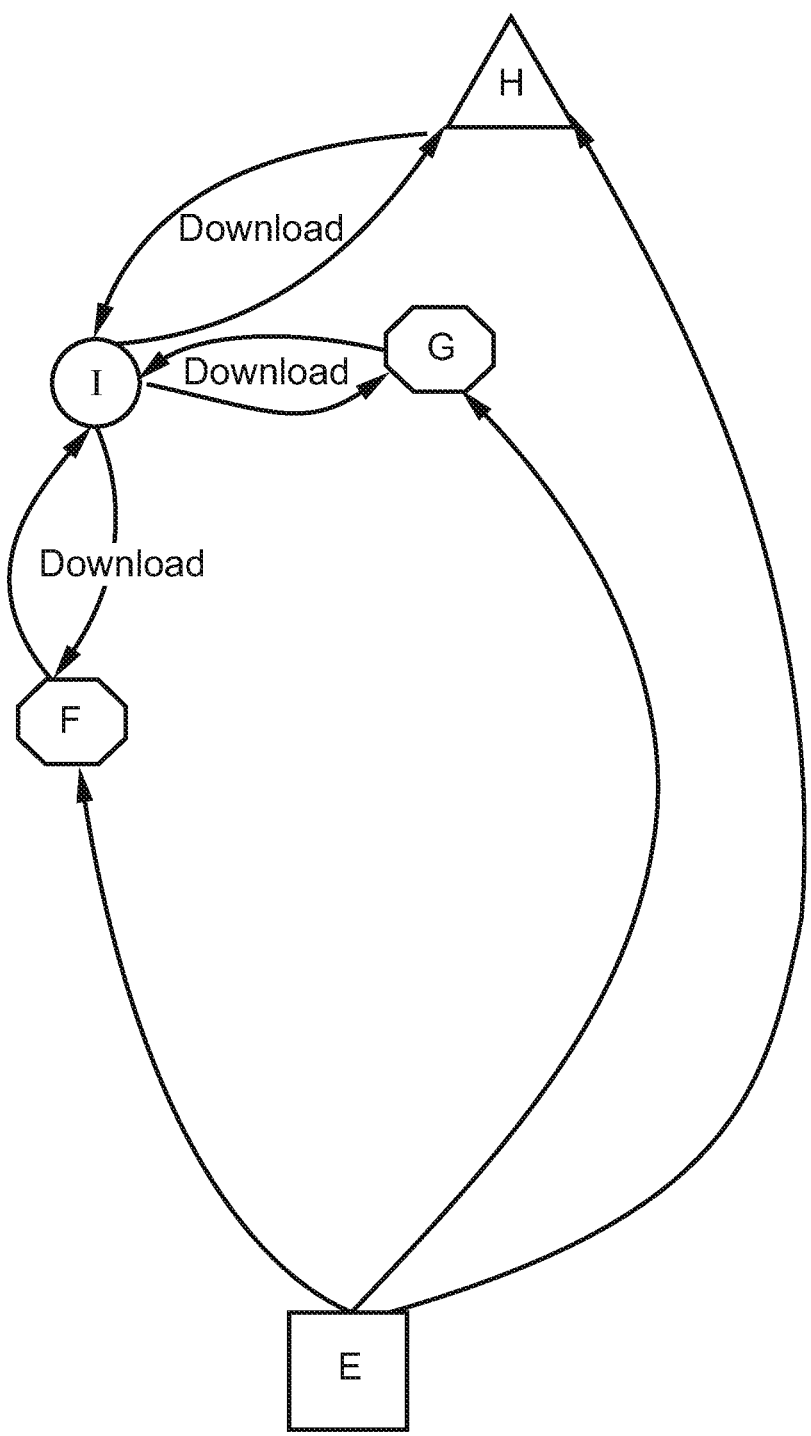
FIG. 7 is an example of another possible action against the illegal or unauthorized distributor, which is based on simultaneous download of the illegal or unauthorized content using several connections.

Reference is now made to FIG. 7, which is a network element diagram showing an example of another possible attack against the illegal distributor (I). The attack is based on simultaneous download of the illegal content using several connections (either via a single element or via several coordinated elements). Preferably, the number of simultaneous downloads is such as to saturate the system or, at least, reduce the available resources of (I).

Figure 8:
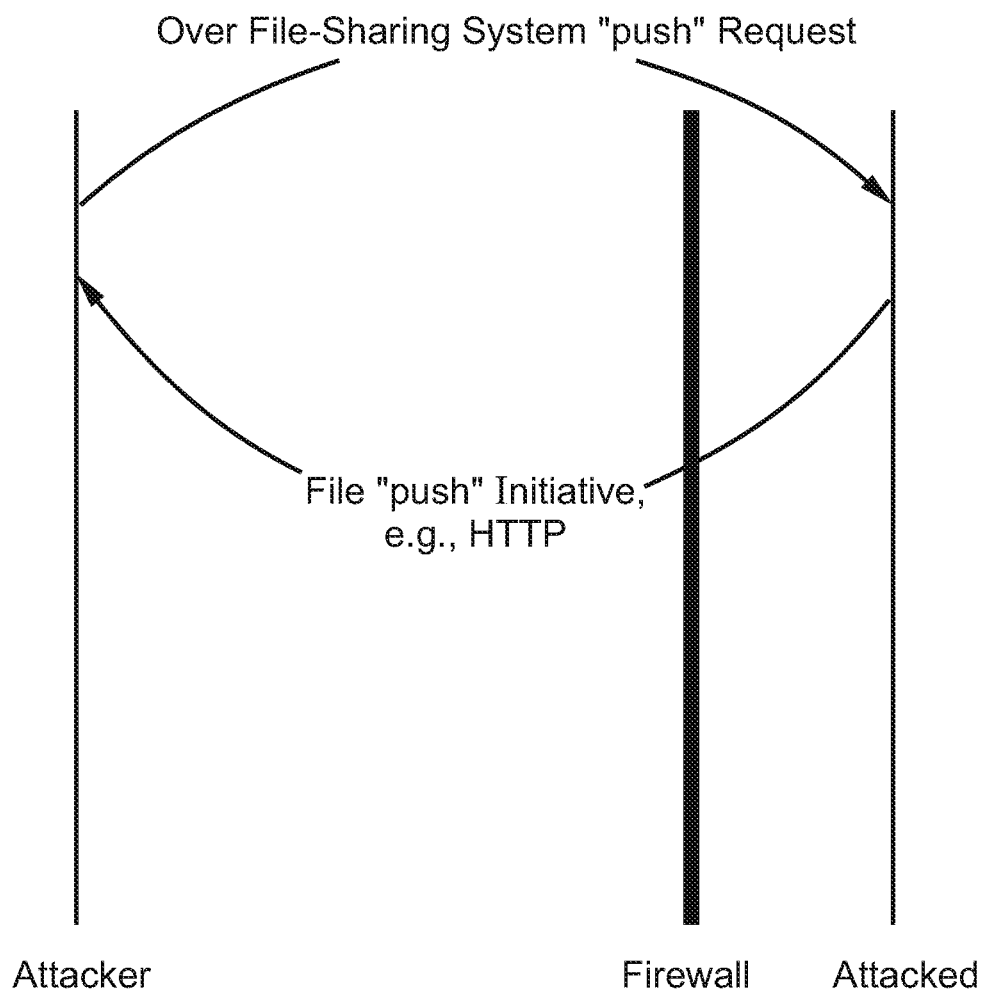
FIG. 8 is an illustration of a method that allows an attack even in case in which the distributor is protected by a "firewall" software. In this case, the offensive element initiate a "push" request using methods that are supplied by the file sharing system, thereby causing the distributor to establish a file "push" initiative (e.g., HTTP connection) with the offensive element.

Reference is now made to FIG. 8, which is a schematic diagram illustrating elements involved in an attack over a firewall. Often the distributor is protected by firewall software, which does not allow the offensive elements to initiate a file "get" (e.g., an HTTP connection able to initiate downloading of the data) with the distributor. In the case of a firewall, the offensive element preferably initiates a "push" request using methods that are supplied by the file sharing system (usually sending the request over a control connection initiated by the server), thereby causing the distributor to initiate the required file transfer with the offensive element (either by opening connection to the offensive element or by transferring the file over existing connections through the firewall). The attack thus takes advantage of the fact that the firewall protection has to leave openings to allow regular functioning of the distribution system.

In another form of attack, at least two separate (and possibly very different) offensive elements may be involved—the one sending the request, and the one receiving the file, either may have other functions in the system (especially the first which may mainly be a surveillance element), where a controlling element may be involved in coordinating the attack.

Figure 9:
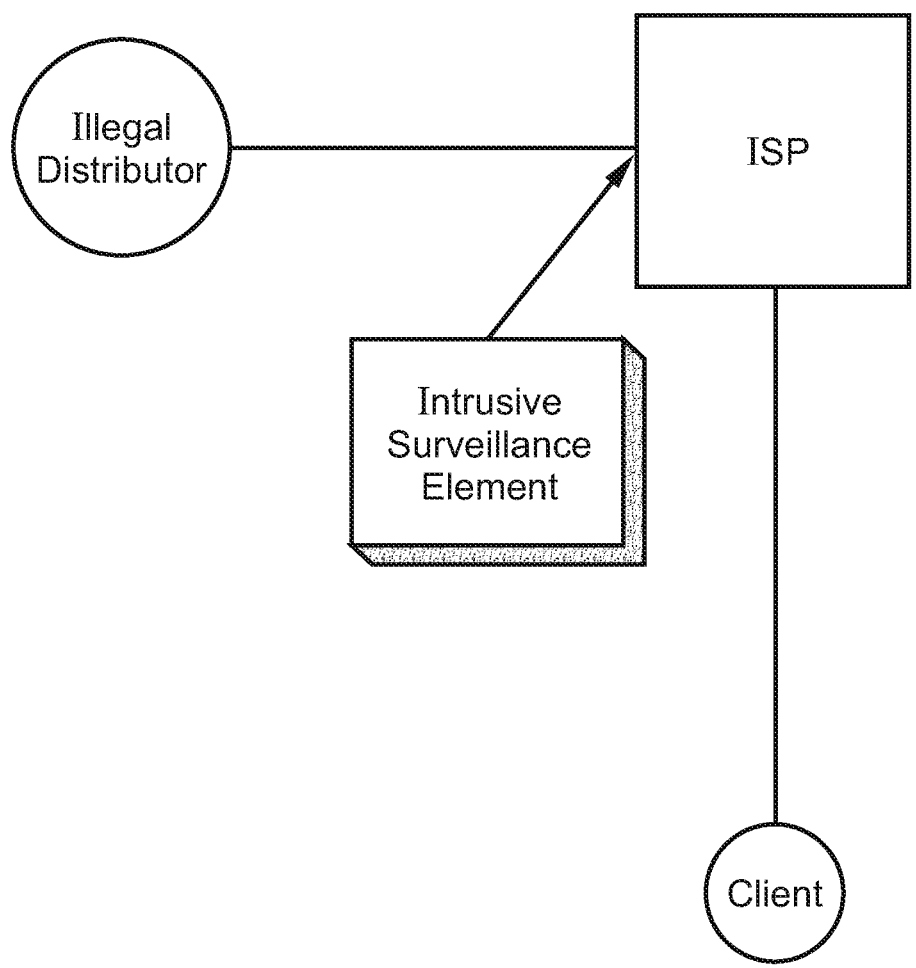
FIG. 9 is an illustration of the usage of an intrusive surveillance element, which scans communication protocols such as Internet Protocol in order to find illegal or unauthorized content in transport.

Reference is now made to FIG. 9, which is a schematic diagram showing how the intrusive surveillance element may be used to carry out transport searches. The illegal distributor generally uses a communication protocol such as the Internet Protocol (IP) in order to send data to a client unit. Preferably, the intrusive surveillance element intercepts and scans data coming from a suspected illegal distributor, using the relevant communication protocols, in order to find illegal transport content. Detection may be based on alphanumeric descriptions of the content it is sought to protect and/or on the audio/video/text signal properties thereof.

Figure 10:
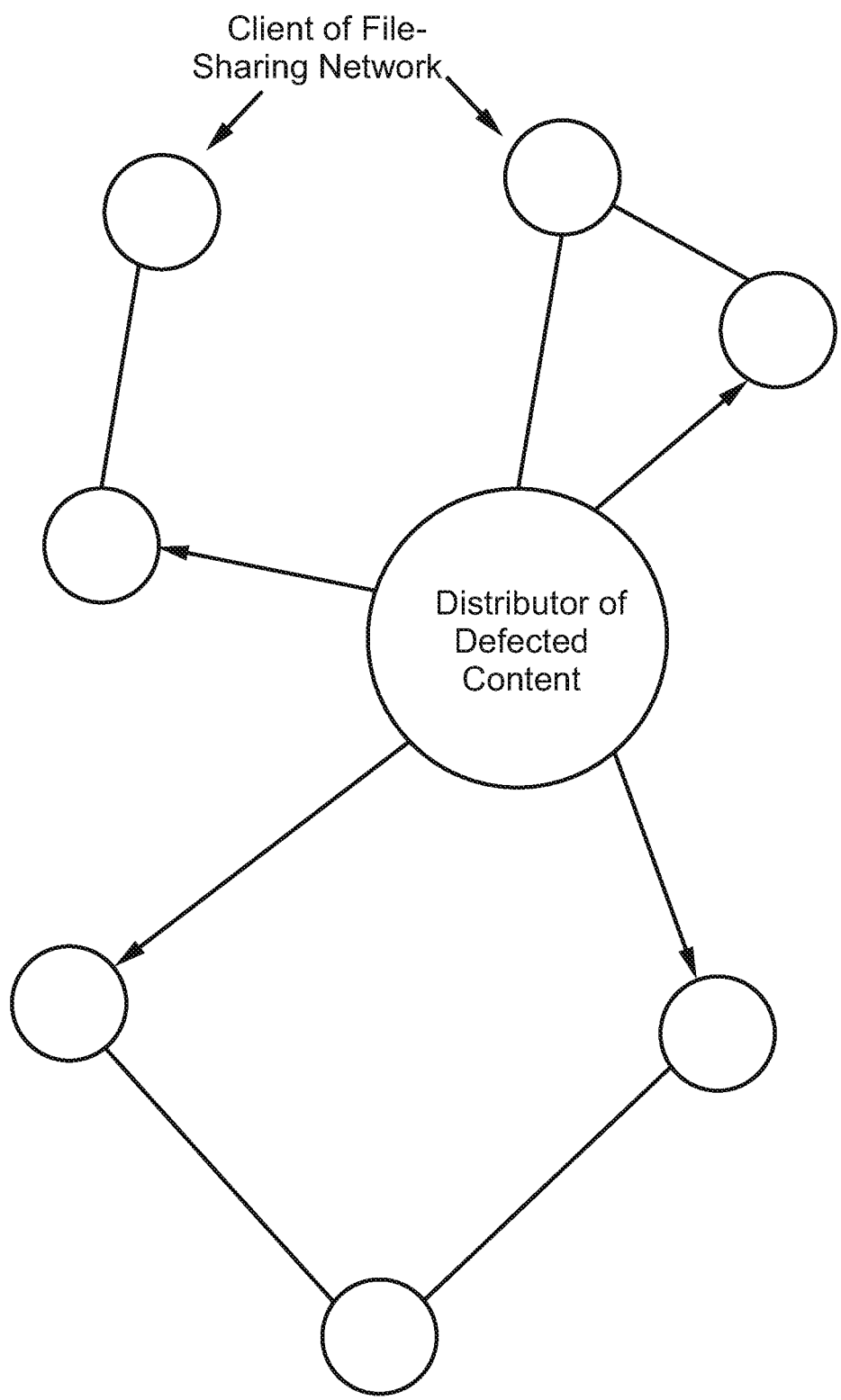
FIG. 10 is an illustration of a method to reduce the desirability of illegal or unauthorized usage of file sharing systems by replaying to requests for an illegal or unauthorized content by sending versions of the content that may not satisfy the user.

Reference is now made to FIG. 10, which is a simplified schematic diagram showing a method for reducing the desirability to end users of illegal file sharing systems. The method comprises intercepting requests for illegal content and replying to them by sending a version of the content that does not satisfy the user. The versions may be for example defective, of low visual or audio quality, contain large amounts of unwanted material, be totally irrelevant etc. The request is intercepted before it reaches the illegal content provider and thus he does not even know that the request was made. On the other hand the user receives content in reply to his request, which preferably partly corresponds to what he requested, leading him to believe that he downloaded the information from the site to which he addressed his request but that the site provides sub-standard material. The user is thus discouraged from using the source again.

Other possible attacks that may be considered for use in the present embodiments may be based on exploitation of flaws in the clients. For example clients expect data to conform to certain protocol standards and it is possible to intercept requests and send data that does not conform to the relevant protocols. Thus malformed messages that cannot be processed by the client may be considered. Possibilities for malformed messages included messages comprising non null terminated strings, spoof push sources, wrong field size descriptors, malformed get requests (i.e. non numeric file index). Such attacks have the potential to disable the client or seriously disrupt its operation if not anticipated by the programmer.

In some file sharing systems (e.g., "Gnutella"), requests are characterized by identification numbers ("request ID"). In general, nodes in the network will not propagate a request if they have already propagated a request with the same ID. Another possible attack that may be considered for use in the present embodiments may therefore be based on the following method: When an attack element receives a request for illegal content, it propagates a spoofed request with the same ID number, thereby, with some probability, causing some of nodes to neglect the original request. Other similar methods of using spoofed or otherwise fake messages can be used to disrupt some aspects of the network or of a certain node or nodes in it, depending on the specification of the network.

A coordination element or elements may be present which would coordinate such attacks.

Another surveillance element which should be considered is a port scanning element—which may scan a given portion of the network, trying to connect to all, or to a subset of the available ports in the network portion, and establish a connection of the file sharing network, trying to discern if there are content sharing nodes in it. This surveillance element may be autonomous or coordinated with other elements.

It is observed that the above described system may also accumulate and report or otherwise use data about what is shared and transferred and divulge information about the participating parties, their locations, interests etc. which may be used for decision making, legal marketing or other purposes.)

It is also noted that Artificial Intelligence methods may be used for various needs of such a system (such as methods for recognizing the content and related information—especially text analyzing methods, symbolic logic and some forms of fuzzy logic) and for correlating data gathered to produce more meaningful or valuable information.

Document Distribution Networks

Focusing now on document distribution networks, primary consideration will be given to the Internet Newsgroup document distribution network, since it is widely used for document distribution in infringement of copyright and for illegal distribution of video and audio content. The methods described herein are nevertheless applicable, in whole or in part, to other document distribution networks.

Detection of Illegal Content in Newsgroups

Figure 11:
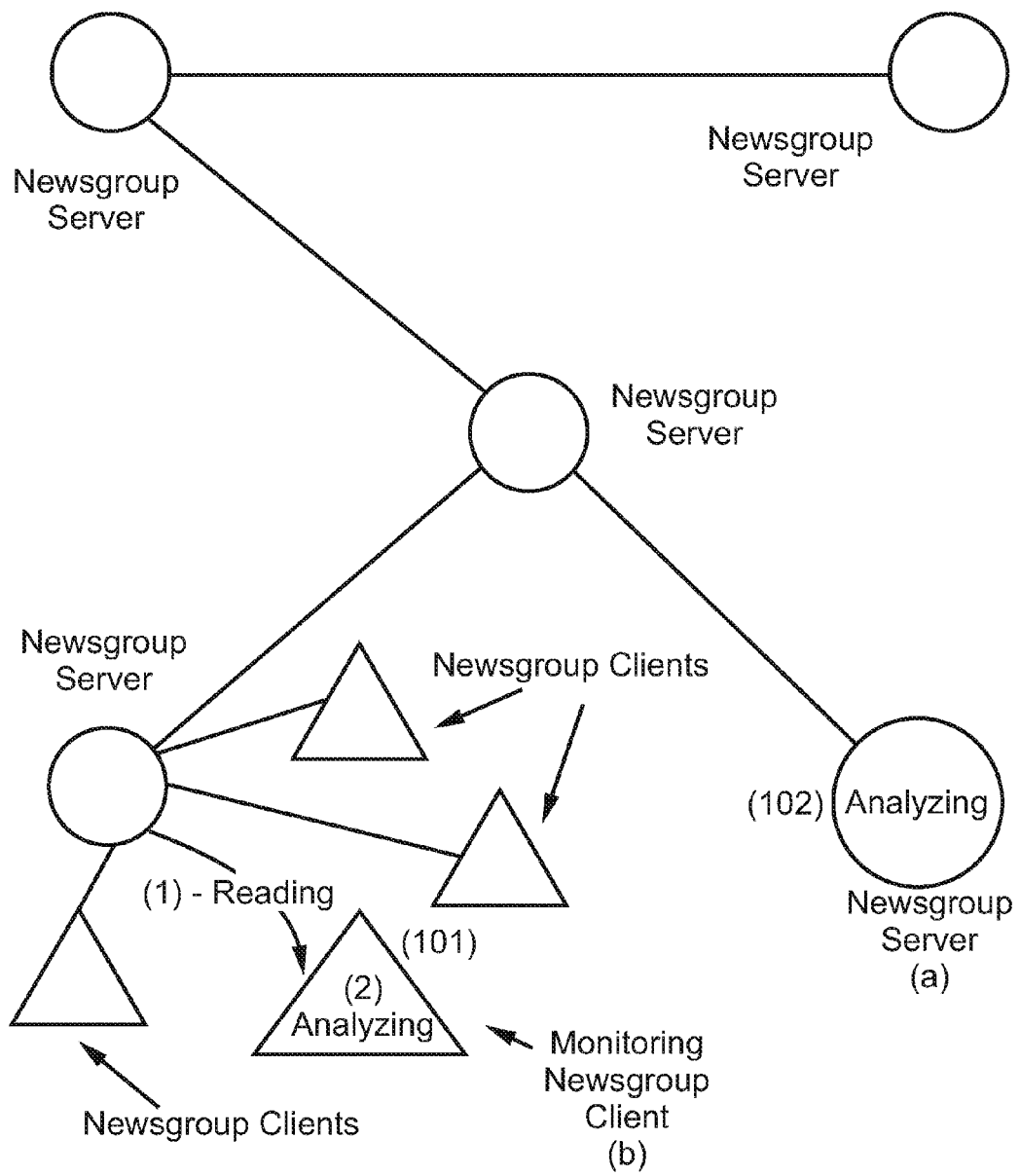
FIG. 11 is an illustration of two search methods for illegal or unauthorized content in a newsgroup.

Reference is now made to FIG. 11, which is a simplified schematic diagram of a newsgroup server client arrangement. Newsgroups are non-proprietary lists of messages placed by individual users and thus it is neither possible nor desirable to attack the newsgroup itself. Rather the target in the case of the newsgroup has to be the individual message containing the illegal content.

Two methods for detection of illegal content in newsgroups are described hereinbelow. In the first method a search client element (101) according to an embodiment of the present invention logs on to a news server in the same way as a regular client, and builds a listing or carries out downloading of the messages in the groups suspected of delivery of the protected content.

After the messages have been received, they are preferably assembled together to reconstruct (wholly or partly) the original files sent. That is to say, in newsgroups, large files are usually sent by splitting them into much smaller files and generally the material that it is desired to protect tends to be large. The reconstructed file may then be examined by other methods referred to in the present disclosure.

Another method of detecting newsgroup content comprises connecting to the news server in the guise of another news server (102), and requesting batch delivery of the news groups of interest. Once delivery is complete, the server's spool contains all the messages that belong to the groups requested, where they may undergo composition and analysis as in the first method.

Cancellation of Messages that Contain Illegal Content.

Figure 12:
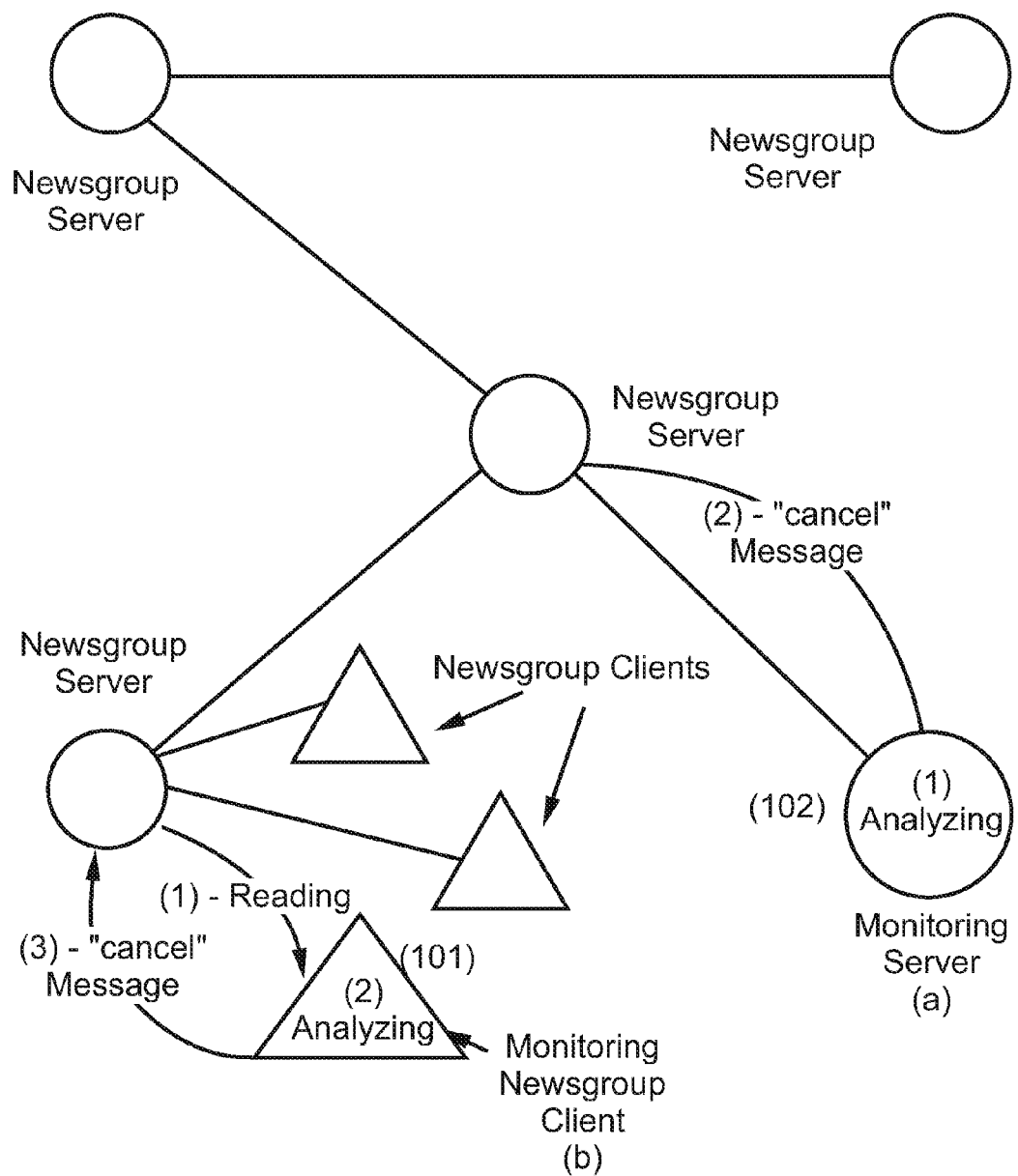
FIG. 12 is an illustration of two methods for canceling newsgroup messages that contain illegal or unauthorized content.

Reference is now made to FIG. 12. FIG. 12 is a simplified block diagram illustrating how an attack may be launched against illegal content on a newsgroup. Once protected content has been discovered, the system may issue commands to the news server network to delete messages that contain the protected content. The commands are referred to in the art as "cancel message" and are preferably delivered from the client (101) to the local server (first method) or from the spoof server (102) to other servers (second method). The news servers network preferably propagates the cancel message as an ordinary network message, each server in turn deleting the protected content when the cancel message arrives.

In order to enhance the effectiveness of the newsgroup attack the cancel messages may be delivered to multiple news servers at the same time, causing a reduction of the time for global propagation of the protected content.

There is thus provided a method and apparatus for automatic external content monitoring and control over computerized networks.

It is appreciated that one or more function of any of the methods described herein may be implemented in a different manner than that shown while not departing from the spirit and scope of the invention.

While the methods and apparatus disclosed herein may or may not have been described with reference to specific hardware or software, the methods and apparatus have been described in a manner sufficient to enable persons having ordinary skill in the art to readily adapt commercially available hardware and software as may be needed to reduce any of the embodiments of the present invention to practice without undue experimentation and using conventional techniques.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

What is claimed is:

1. A method for controlling distribution of copyrighted content on a digital file-sharing network comprising a plurality of nodes, the method comprising:

connecting, by a computing device, to available port connections on the plurality of nodes;

first searching, by the computing device, for copyrighted content whose distribution for consumption it is desired to control on the plurality of nodes, wherein said searching utilizes search features provided by the digital file-sharing network;

second searching, by the computing device, for the copyrighted content based on an analysis of data being transported between the plurality of nodes, wherein the analysis comprises a scanning of a communication protocol used in the data being transported, wherein the second searching comprises a polymorphic search of content names or descriptors to cover a plurality of forms in which said content names or descriptors may appear, and wherein the second searching comprises further searching based on idiosyncratic properties that exist in an original audio or video signal of the copyrighted content;

logging on, by the computing device, to a server as a regular client;

downloading, by the computing device, messages on the server;

reconstructing, by the computing device, an original file from assembling the messages downloaded from the server and searching the original file for the copyrighted content; and performing, by the computing device, a denial of service (DoS) attack against one or more of the plurality of nodes that are involved in content piracy, wherein the denial of service attack comprises one or more of: multiple "syn" messages, multiple connections, simultaneous downloads of the copyrighted content, intercepting requests for the copyrighted content and replying with a version of the copyrighted content that is of low visual or audio quality, contains large amounts of unwanted material, or is irrelevant, and sending malformed requests or data that does not comply with protocols relevant to the digital file-sharing network.

2. A computer system for controlling distribution of copyrighted content on a digital file-sharing network comprising a plurality of nodes, the computer system comprising one or more computing devices configured to perform acts comprising:

connecting, by a computing device, to available port connections on the plurality of nodes;

first searching, by the computing device, for copyrighted content whose distribution for consumption it is desired to control on the plurality of nodes, wherein said searching utilizes search features provided by the digital file-sharing network;

second searching, by the computing device, for the copyrighted content based on an analysis of data being transported between the plurality of nodes, wherein the analysis comprises a scanning of a communication protocol used in the data being transported, wherein the second searching comprises a polymorphic search of content names or descriptors to cover a plurality of forms in which said content names or descriptors may appear, and wherein the second searching comprises further searching based on idiosyncratic properties that exist in an original audio or video signal of the copyrighted content;

logging on, by the computing device, to a server as a regular client;

downloading, by the computing device, messages on the server;

reconstructing, by the computing device, an original file from assembling the messages downloaded from the server and searching the original file for the copyrighted content; and performing, by the computing device, a denial of service (DoS) attack against one or more of the plurality of nodes that are involved in content piracy, wherein the denial of service attack comprises one or more of: multiple "syn" messages, multiple connections, simultaneous downloads of the copyrighted content, intercepting requests for the copyrighted content and replying with a version of the copyrighted content that is of low visual or audio quality, contains large amounts of unwanted material, or is irrelevant, and sending malformed requests or data that does not comply with protocols relevant to the digital file-sharing network.

3. A non-transitory computer-readable storage medium with instructions stored thereon that, when executed by one or more computing devices, cause the one or more computing devices to perform operations comprising:

connecting to available port connections on the plurality of nodes;

first searching for copyrighted content whose distribution for consumption it is desired to control on the plurality of nodes, wherein said searching utilizes search features provided by the digital file-sharing network;

second searching for the copyrighted content based on an analysis of data being transported between the plurality of nodes, wherein the analysis comprises a scanning of a communication protocol used in the data being transported, wherein the second searching comprises a polymorphic search of content names or descriptors to cover a plurality of forms in which said content names or descriptors may appear, and wherein the second searching comprises further searching based on idiosyncratic properties that exist in an original audio or video signal of the copyrighted content;

logging on to a server as a regular client;

downloading messages on the server;

reconstructing an original file from assembling the messages downloaded from the server and searching the original file for the copyrighted content; and performing a denial of service (DoS) attack against one or more of the plurality of nodes that are involved in content piracy, wherein the denial of service attack comprises one or more of: multiple "syn" messages, multiple connections, simultaneous downloads of the copyrighted content, intercepting requests for the copyrighted content and replying with a version of the copyrighted content that is of low visual or audio quality, contains large amounts of unwanted material, or is irrelevant, and sending malformed requests or data that does not comply with protocols relevant to the digital file-sharing network.

\* \* \* \* \*